Patented June 18, 1929.

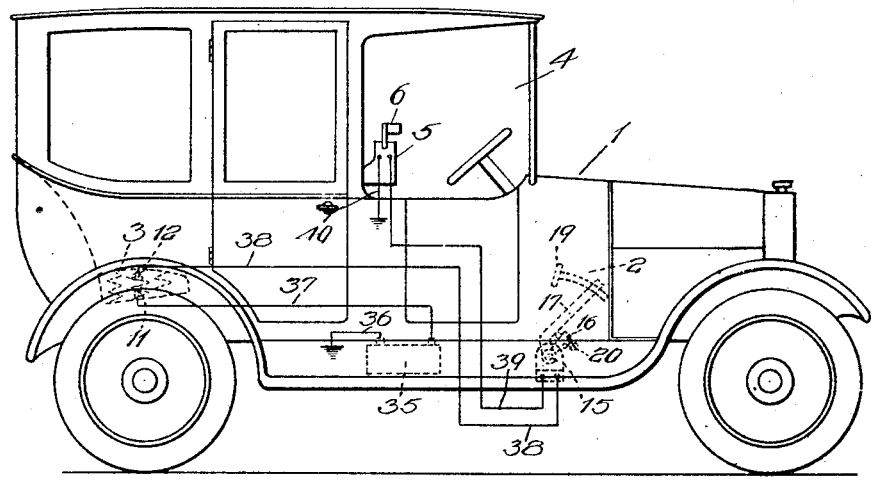

1,717,602

UNITED STATES PATENT OFFICE.

LELAND F. GOODSPEED, OF KALAMAZOO, MICHIGAN.

TAXICAB CONTROL.

Application filed November 30, 1923. Serial No. 677,898.

My invention relates to commercial vehicles such as taxicabs and the like.

In a vehicle operated for hire or public service it is desirable that transportation of the passenger or other load should not occur without the collection of a suitable charge. This is easily taken care of if the operator of the vehicle is at the same time the owner; but in the case of vehicles owned by one interest, or individual, and operated by a different interest or individual, the operator is interested in the largest return to himself, and since he is the one who deals directly with the customer or paying public, the owner is at the mercy of a dishonest operator.

The taximeter has been introduced to cure this evil. The taximeter registers fare computed according to time and mileage. The operator is instructed to "pull the flag;" that is, to start into operation the taximeter as soon as the haul begins, and is instructed to hoist the flag only when the passenger leaves the cab at the end of the trip.

The fulfilling of instructions is a matter subject to enforcement and this may require a corps of investigators and spies. This creates suspicion and mistrust and drives further apart the viewpoints of the owner and the operator. I have observed that if a mechanical law of operation can be substituted for a rule, the desired result is self-enforceable.

I have provided means for compelling the enforcement of the rule that if a passenger occupies the cab the meter must be put into operation and kept so during the haul.

I do this by disabling the driving mechanism when the cab is occupied and permit operativeness to be restored only when the flag on the meter is pulled.

While herein I describe the invention as applied to taxicabs, it is to be understood that the invention is equally applicable to all commercial hauling and to other problems where a meter service is rendered to members of the public by an operator who is not owner of the mechanism employed in rendering such service.

More specifically, in the preferred form of my invention, I interlock the driving mechanism with the passenger seat and the taximeter, so that if the passenger seat is occupied the driving mechanism is disabled until the taximeter flag is pulled.

The specific means for doing this may be widely varied within the broad teachings of my invention.

In order to teach those skilled in the art how to construct and operate my invention, I shall now describe a specific embodiment of the same in connection with the accompanying drawings in which, Fig. 1 is a side view of a vehicle showing in diagram the connections for interlocking the seat, the taximeter and the driving mechanism;

Fig. 2 is a sectional view through the magnetically controlled pawl and ratchet mechanism for holding the clutch in disconnected position;

Fig. 3 is a section taken on line 3—3 of Fig. 2 showing the same;

Fig. 4 is a detail elevation showing the contacts controlled by the shaft of the flag on the taximeter; and Fig. 5 is a circuit diagram illustrating how a signal may be substituted for the mechanical lock.

The vehicle 1 is a taxicab of the usual character employing suitable driving mechanism, such as an internal combustion engine, as is well understood by those skilled in the art. The driving engine is connected to the rear wheels through the usual clutch, gear transmission, propeller shaft, and differential, all as is well understood in the art, and of any preferred or suitable construction. The cab has a passenger's seat in the rear, as indicated in dotted lines at reference numeral 3, and it has the usual driver's compartment 4 in the front with a taximeter 5 of the usual construction, provided with a usual signal or "flag" 6 which is, at the same time, an indicator for indicating the occupied or unoccupied condition of the cab and for indicating that the meter is in registering or non-registering position. The construction of taximeters of this character is well understood and needs no explanation here. Suffice it to say that when the flag 6 is pulled, that is, thrown down, it indicates that the cab is occupied and that the meter is connected to the driving mechanism for metering the distance which the passenger travels. When the flag is raised, as shown in Fig. 1, it is an indication that the cab is unoccupied and is for hire, and that the taximeter is disconnected from the driving mechanism so that no registration is being made on said taximeter for tariff. A similar instrument also suitable for this purpose is marketed by the American Taximeter Company of New York. Such a taximeter is connected by a suitable flexible driving connection to either the front wheels or to the transmission, and the flag controls the clutching of this driving shaft to the registering mechanism. At the same time the flag throws into operation suitable clock mechanism, so that registration on the meter is made for distance covered and for any time consumed when not running. The shaft 7 upon which the flag is mounted to oscillate, is provided with means for opening a control circuit, as indicated in Fig. 4. The shaft 7 has a cam 8 which is adapted to depress or release the contact spring 9 out of engagement with the stationary contact spring 10 so as to open the circuit including these two contacts.

The rear seat 3 which is adapted to be occupied by a passenger, is provided with contacts 11 and 12, which are normally separated by the coil springs contained within the seat. The contacts 11 and 12 may be duplicated throughout the area of the seat and may be duplicated on all of the seats provided within the vehicle. I term the seat 3 a "load platform", since that is its fundamental purpose. I have shown merely the two contacts 11 and 12 as sufficiently illustrative of the necessary construction. The contacts 11 and 12 are connected in series in a circuit with the contacts 9 and 10, as will be apparent from the following.

The operating shaft for the clutch which connects the engine to the driving shaft leading to the gear box and thence to the rear wheels, is shown at 15, this clutch operating shaft has an operating lever or arm 16 keyed or otherwise secured thereto, and a clutch pedal lever or arm 17 loosely mounted on the end of said shaft 15 and held between the bearing collar 18 and the hub 19' of said operating lever 16. The pedal lever 17 has a suitable operating pedal 19 adapted to be engaged by the foot of the operator for throwing the clutch out and for letting it in. The arms 16 and 17 are connected by an adjustable stop comprising a set screw threaded through the end of the operating arm 16 and engaging the arm 17. This bolt is suitably locked in position by a lock nut, all as is well understood in the art. The arm 17 and said adjustable bolt 20 are held in contact by a spring 21 so that the pedal lever 17 and pedal 19 are not positively connected to the shaft 15 for return motion. Hence, no leverage can be exerted upon the shaft 15 to force it back into position when the pawl and ratchet mechanism tends to hold it out, as will be described later.

I have mounted upon the shaft 15 and secured to the engine frame a housing 22 comprising two complementary halves comprising bearing portions 23 and between them a ratchet wheel 24 which is keyed to the shaft 15, as indicated at 25. The teeth of this ratchet 24 are adapted to be engaged by a pawl 26 which has cooperating teeth. The pawl 26 is guided in a suitable recess formed in the lower part of the casing 22. The pawl is preferably rectangular in cross section and fits relatively snugly in its guiding recess, so that alignment of the teeth of the pawl 26 with the teeth of the ratchet wheel 24 is maintained. The bottom part of the casing 22 has extending flanges 27, to which flanges is secured the housing 28 of solenoid 29. The magnet 29 comprises a plunger 30 and an armature 31, this armature being adapted to be attracted to the poles of the magnet for raising the plunger 30. The ratchet member 26 is supported upon the upper end of the plunger 30 and is thereby raised so that the teeth 32 thereof are brought into engagement with the teeth 33 on the pawl 24. Thus, when the magnet is energized these two sets of teeth are yieldingly held in engagement with each other.

The magnet 29 is included in circuit with the contact springs 9 and 10 in the meter 5, and is connected in series with the contacts 11 and 12 in the passenger seat 3 to the storage battery 35, or other suitable source of current. The storage battery 35 is connected at one side to ground, as indicated at 36. This is usual in most types of wiring in automobiles. The opposite pole of the battery is connected as by the wire 37 directly to the contact 11 in the rear seat 3, the cooperating contact 12 being connected by wire 38 to one terminal of the magnet 29. The opposite terminal of the magnet 29 is connected by wire 39 to the spring 10 in the taximeter 5, the cooperating spring 9 being connected to ground, as indicated at 40. A full metallic circuit may be employed instead.

The operation of the mechanism is as follows:—

The circuit is normally open at contacts 11 and 12, and normally closed at contacts 9 and 10 when the flag 6 is up. The magnet 29 is normally de-energized because of the open circuit, and the pawl 26 drops down by its own weight out of engagement with the ratchet 24. Hence the clutch pedal 19 may be depressed to disengage the clutch and release to reengage the clutch without any interference.

Assume that a passenger occupies the rear seat. The weight of the passenger closes the contact 11—12, and as previously explained, as many of these contacts may be connected in parallel in the rear seat cushion 3 as may be desired. Closing of the circuit at the contacts 11—12 immediately results in energization of the magnet 29 with the result that it raises its armature 31 and brings the pawl 26 into engagement with the ratchet 24. Thus the two sets of teeth are held in contact and if the driver now attempts to start the car by going through the usual procedure of depressing the clutch pedal to throw the clutch out of operation, and then to operate the gear shift handle to select low speed for starting, he will find that the pedal 19 will be freely depressed, but so long as the magnet 29 is energized the shaft 15 cannot return to its original position with the result that the clutch is held in disengaged position and the engine cannot therefore be connected to the propeller shaft, or that part of the propeller shaft which leads into the transmission or gear box. In order for the driver to be able to reengage the clutch of the engine, it is necessary that the circuit of magnet 29 be broken, and this can be accomplished only by pulling the flag 6; that is to say, putting the meter into operative condition, or by opening the circuit at the contacts 11 and 12 by discharging the passenger. Thus, in order to begin the haul of a passenger, it is necessary to throw the taximeter into operation in order to be able to connect the engine to the rear wheels for driving purpose.

Since the purpose of the invention is to prevent the hauling of a passenger without operation of the taximeter, it will be seen that numerous modifications and variations may be made, and that the particular scheme which I have shown is not the only way in which the invention can be carried out.

I do not intend to be limited to the details shown nor described, except as set forth in the following claims.

I claim:—

1. In combination, a clutch shaft, a split housing loosely mounted on a shaft, a ratchet wheel secured to the shaft and mounted in said split housing, said split housing having flanges at its lower end, magnet mechanism secured to said flanges, a pawl guided in the housing, said pawl being adapted to engage said ratchet, and a connection between said magnet and said pawl.

2. In combination, a clutch shaft, a split housing loosely mounted on a shaft, a ratchet wheel secured to the shaft and mounted in said split housing, said split housing having flanges at its lower end, magnet mechanism secured to said flanges, a pawl guided in the housing, said pawl being adapted to engage said ratchet, and a connection between said magnet and said pawl, a clutch pedal loosely mounted on said clutch shaft, and an operating arm secured to said shaft and engageable by said clutch pedal.

3. In combination, a clutch operating shaft having an operating arm fixed thereupon, a pedal arm loosely mounted thereupon, but adapted to engage the operating arm for throwing the clutch out of operation, a ratchet secured to said shaft, a pawl adapted to be yieldingly held in contact with the ratchet to permit the clutch operating shaft to be actuated to throw out the clutch, but to hold said shaft against return movement.

4. In combination, a clutch shaft, an operating arm secured thereto, a pedal arm loosely mounted thereupon and engaging said first arm, a ratchet secured to said shaft, a pawl for said ratchet, and magnetic means for throwing said pawl into engagement with said ratchet to prevent movement of the clutch operating shaft in a direction to close the clutch.

In witness whereof, I hereunto subscribe my name this 26th day of November, 1923.

LELAND F. GOODSPEED.